Patented Oct. 28, 1952

2,615,815

UNITED STATES PATENT OFFICE 2,615,815

CORROSION INHIBITING COMPOSITION

Gerald David Galvin and Alexander Espie McAulay, Fulham, England, assignors to Shell Development Company, San Francisco, Calif., a corporation of Delaware No Drawing. Application December 21, 1948, Serial No. 66,593. In Great Britain March 12, 1948

16 Claims. (Cl. 106—14)

This invention relates to compositions having the ability of displacing moisture, corrosive materials and the like from corrosive surfaces. The invention also pertains to the formation on such surfaces of a non-corrosive moisture resistant protective film. More particularly, this invention pertains to corrosion inhibiting compositions suitable for protecting metal and non-metal surfaces by rendering them impervious to water, electrolytic solutions, corrosive fluids, gases, and the like, by displacing said contaminant from said surfaces and forming thereon a tenacious protective film.

It is well known that moisture, corrosive fluids and gases, e. g. $H_2S$, $SO_2$, etc. readily attack not only metallic surfaces but non-metallic surfaces, and cause corrosion, rusting, pitting and other damage to such surfaces. Also, aqueous solutions when in contact with a metallic surface readily attack it and cause corrosion and rusting. Under certain conditions the problem of corrosion becomes exceedingly serious because once started it becomes progressively accelerated. Thus, oils containing small amounts of water become very corrosive to contacting metals. This is due to the fact that oils and particularly liquid petroleum hydrocarbons are very good solubilizers of oxygen and any moisture present therein becomes surrounded by an almost inexhaustible store of oxygen. Moisture under such conditions is inhibited from evaporating and since the rate of transfer of oxygen from hydrocarbons, such as mineral oil or gasoline, to water is limited, ideal conditions for rusting and corrosion are set up. The presence of electrolytes and formation of corrosive decomposition products in oils and the like also greatly increase the rate of corrosivity.

Under conditions where, in addition to those enumerated, elevated temperature is encountered, corrosion activity is greatly accelerated. Thus, moisture, salt sprays and other contaminants or acidic decomposition products and corrosive gases formed during operation of engines, such as internal combustion engines, diesel engines, aircraft engines, turbines and various other machinery and industrial equipment, readily attack and rust or corrode contacting metal surfaces. The damage thus caused is not to the metal surface alone for rust particles frequently break off and enter the circulating system of engines, and cause plugging, clogging, and fouling of conduit lines, columns, plates, and lines of cracking equipment, tubes, evaporators, etc.

Corrosion of alloyed bearings and other alloyed surfaces due to contact with water can attain such an aggravated state as to cause great fatigue stresses to be set up, which ultimately result in cracking of the metal.

The problem is equally serious when combating rusting and corrosion of steel drums, storage tanks used to store gasoline, hydrocarbon oils and the like. Moisture adhering to pickled steel, quenched steel, equipment such as instruments, engine starters and generators on landing crafts, hydraulic systems, machinery for metal processing and the like are also extremely susceptible to corrosion and must be protected.

Besides metal surfaces, materials such as rubber equipment, electrical insulation, brake and clutch lining, etc. suffer damage when in contact with water, aqueous solutions, corrosive fluids and the like.

Such contaminants also have a detrimental effect upon the medium in which they are dispersed. In lubricating and liquid fuel mediums they cause oxidation, interfere with the functioning of additives or decrease their efficiency, form emulsions and thickening of the fluid and generally cause gumming and sticking of movable parts.

Countless materials and compositions have been tried for protecting surfaces such as metal surfaces against damage caused by water, corrosive fluids and the like by forming on said surface a non-reactive corrosion preventive film. Metal surfaces have been coated or treated with greases, fatty compositions, waxes, organic compounds, e. g., organic acids, amines, inorganic compounds and the like in order to protect them against corrosion. In almost all cases where no chemical reaction occurs between the surface treated and the corrosion or rust inhibitor very little benefit is derived. This is due to the fact that non-chemical reactive inhibitors are incapable of penetrating the surface being protected and are incapable of displacing the contaminant therefrom. In cases where such inhibitors are able to form protective coatings on surfaces they are easily displaced by moisture or rupture readily. They are also relatively ineffective against corrosive acidic materials and hot gases such as are formed during operation of combustion and turbine engines and are easily destroyed when applied to surfaces which are subjected to high temperatures.

It is an object of this invention to protect metal surfaces in contact with corrosive contaminants against corrosion by treating said surfaces with a composition having the property of displacing said contaminants from said surface and forming thereon an impermeable tenacious protective film. It is another object of this invention to protect metallic surfaces with a water-displacing, water-resistant non-corrosive protective film having no detrimental effect upon the metal surface treated. It is still another object of this invention to provide metal surfaces with a water and acid-resistant film which is not susceptible to rupture even at elevated temperatures and which could be readily removed when desired. Still another object of this invention is to form protective films on metal surfaces which are not detrimental to contacting fluids and which do not interfere with their function as lubricants, fuels, hydraulic fluids, quenching agents and the like. Another object of this invention is to form a composition of matter capable of protecting metal surfaces from corrosion, said composition also possessing lubricating properties. Another object is to form film-forming metal-protective compositions which are stable and readily miscible with petroleum hydrocarbons, such as lubricating oils and the like. It is also another object of this invention to treat surfaces whether metallic or non-metallic, so as to form thereon a protective film which is impervious to moisture and corrosive fluids, and which can be readily removed when desired. Other objects will be apparent from the following description.

It has now been discovered that various metals and other materials subjected to corrosive influences can be protected simply and effectively by treatment with a composition of matter comprising a major amount of a light petroleum hydrocarbon and mixtures thereof having a boiling range of from 50° C. to about 370° C. and minor, but critical, amounts of (a) a particular petroleum refinery by-product which will hereinbelow be fully discussed and identified, (b) a specific type of metal protective agent or agents, (c) an oil-soluble petroleum sulfonate derived from the raffinate fraction of a solvent treated petroleum hydrocarbon rich in aromatics, said sulfonates having water displacing properties, and (d) a spreading agent. As stated previously, each component of this composition must be present in rather critical proportions and must be present at all times during the active life of the composition in order to function as an effective water displacing, non-corrosive, surface protective composition.

The dispersing medium or base of the present composition is substantially a water-immiscible hydrocarbon, or halogenated hydrocarbon, having a boiling point range between about 50° C. and 370° C. Dispersing media boiling outside this range have been found to be definitely inferior since they do not possess the required low surface tension and penetrating properties both towards the metal and occluded impurities present so as to allow the metal protective agent to get to the surface, displace any impurity thereon and help form a protective film. These carriers or dispersing media are preferably derived from petroleum hydrocarbons and may include various petroleum naphtha cuts, mineral spirits, mineral seal oil, kerosene, gas oils, kerosene $SO_2$-extract, aromatic solvents, petroleum ether, aromatic hydrocarbons, such as benzene, p-xylene, o-xylene, cumene, butyl benzene; paraffinic hydrocarbons, e. g. normal hexane, dimethyl pentane, octane, nonane, undecane, dodecane; cycloparaffins, e. g. cyclohexane, methylcyclohexane, isopropylcyclohexane; halogenated hydrocarbons such as chlorinated kerosene, carbon tetrachloride, chloroform, etc.

The petroleum refinery by-products referred to hereinbefore and which constitute one of the chief additive agents of compositions of this invention are known in refinery terminology as petroleum residues or lubricating still bottoms. Substantial amounts of these petroleum residues are obtained during the processing of various petroleum crudes and particularly those rich in natural acids such as the cyclic acids and more specifically the naphthenic acids. These constituents along with resinous bodies and other impurities which are generally present in Venezuelan, Trinidad, Californian, Borneo and Roumanian crudes must be removed in order to avoid the formation of emulsions during the working up process in the refining of the crude to high grade lubricants.

The general procedure for removing these materials in order to obtain a high grade lubricant is to subject the crude to a distillation treatment in the presence of alkaline substances such as caustic soda, caustic potash, lime, the alkaline earth hydroxides, carbonates, such as calcium, barium and magnesium oxide, hydroxide or the carbonates and their mixtures, and the like. The acidic constituents present in the crude remain behind as a residue during this distillation treatment in the form of soaps together with resinous materials, asphalt-like polymerization products, some high-boiling viscous mineral oil and other materials.

These petroleum residues have little value other than as a source for naphthenates and naphthenic acids which may be recovered therefrom only at great cost. Generally the amount of these cyclic materials is so small as to make it impractical to recover them from the residue and therefore the residue generally is considered a waste by-product and is generally discarded as such or is occasionally used as a source of fuel.

It has now been found that these petroleum residues when admixed with certain protective agents, petroleum sulfonates and spreading agents and said additives are dispersed together in a light petroleum hydrocarbon fraction, an outstanding water displacing composition having excellent corrosion preventive properties can be obtained. Additionally by the presence of said petroleum residues the amount of the other additives comprising compositions of this invention can be reduced to a minimum.

The preferred petroleum residues falling within the scope of this invention are those obtained by the redistillation of a lubricating oil distillate containing organic cyclic acids such as naphthenic acids, which have been treated with lime. However, other alkaline earth oxides such as barium oxide or magnesium oxide or their hydroxides and/or carbonates may be employed in the preparation of these petroleum residues. Thus, as a specific example, a desired petroleum residue may be obtained in the distillation of lubricating oil from a California base oil and lime in an amount sufficient to neutralize all of the acidic components before or during the distillation. The residue or bottoms remaining in the still may be used without purification or if desired may be given a simple purification treatment. One method of purifying these residues is to dissolve them in a light hydrocarbon such as is to be used as the base for compositions of this invention and then filtering the mixture. The petroleum residue may then be recovered from the filtrate or the entire filtrate used as one of the additives of the invention.

Additives which have been found to possess exceptional wetting power when in combination with the above-mentioned petroleum residues so as to be capable of displacing moisture and other contaminants from various surfaces and thereby aid or allow the protective agent to come in direct contact with the surface being protected are oil-soluble sulfonates derived from raffinate fractions of solvent-treated petroleum oils. The petroleum fractions which may be solvent-treated prior to sulfonation may include petroleum naphthas, kerosene, gas oils, transformer oils, turbine oils, lubricating oils and the like. The solvents may include sulfur dioxide, phenol, furfural, nitrobenzene, "Chlorex," which is the trade name for B,B'-dichloroethyl ether, etc. The raffinate fraction or layer is then removed and is sulfonated with a suitable sulfonating agent, such as sulfuric acid of desired concentration, oleum, $SO_2$—$SO_3$ mixtures, chlorosulfonic acid and the like. The sludge which is formed is removed and the sulfonic acids remaining in the sour oil are recovered by any suitable means such as by alcoholic extraction and thereafter neutralized with metal or organic base compounds such as alkali, alkaline earth and heavy metal compounds or amines, quaternary ammonium compounds and the like. Instead of recovering the sulfonic acids from the sour oil and then neutralizing them, the sulfonic acids may be neutralized when in the oil and then recovered, or the entire oil containing the neutralized sulfonates may be used. Oil-soluble alkali and alkaline earth petroleum sulphonates obtained from raffinate fractions of solvent-treated light petroleum fractions such as the petroleum naphthas, kerosene, gas oil, etc. are particularly preferred. Specifically, the neutral sodium and potassium salts and the neutral and basic calcium, barium, and magnesium petroleum sulfonates are preferred.

Instead of using the alkali sulfonates derived from light petroleum fraction as the sole wetting agent, other well-known wetting agents can be used in combination therewith. Among them can be included esters and salts containing a minimum of 8 carbon atoms in the molecule. Particular examples are soaps or salts of fatty or petroleum acids obtained by oxidizing paraffin waxes, alkali and alkaline earth metal salts, e. g. sodium, potassium, calcium or magnesium salts of wool grease, oleic acid, stearic acid, petroleum acids, naphthenic acids, alkali salts of sulfated alcohols having between about 8 and about 20 carbon atoms in the molecule, e. g. sodium oleyl sulfate, sodium lauryl sulfate, sodium ocenol sulfate, ammonium lauryl sulfate, neutralized alkylated aromatic sulfonates, and alkali salts of mono and poly alkyl esters of sulfodicarboxylic acid, e. g. sodium salt of diamylsulfosuccinic acid, sodium salt of dilauryl sulfosuccinic acid, disodium monocetyl monosulfosuccinate, etc.

The wetting agents of this invention, namely oil-soluble sulfonates derived from the raffinates of solvent-treated, low-boiling, petroleum hydrocarbons, when used alone or in combination with other wetting agents referred to above, possess the unique property of displacing moisture from metal surfaces and in addition act as powerful penetrants, which however are readily displaceable by the protective film-forming agent of this invention. This is apparently due to the fact that these wetting agents are substantially miscible with and have a great affinity for water enabling them to remove moisture from the metal surface and allowing the penetrant and protective film-forming agent to come in direct contact with the surface being treated.

The protective film-forming, water-displacing material of this invention is a fatty material, preferably a partially hygroscopic fatty material such as refined wool fat or lanolin. This material is obtained by extraction, preferably under inert conditions, of raw wool with volatile solvents, such as naphtha, benzol, carbon disulfide, or by scouring the wool with soap solutions and then acidifying with sulfuric acid. Soaps and free acids are removed from the fat and the fat is then sent through presses to obtain the refined product.

The refined wool fat or lanolin has the unique property of displacing moisture particularly from metallic surfaces and forming thereon a tenacious protective film. Just how lanolin performs this function is not exactly understood, but it is believed that the alcohols present therein (cholesterins) have a strong affinity for water while the ester component of the fat have a strong affinity for the metal and forms the protective film thereon. Instead of refined wool fat, the product in its crude form or simply neutralized with alkali or alkaline earth metal oxide, hydroxide or carbonate may be used.

In order to aid the lanolin in forming a more tenacious and permanent film as well as to increase its oiliness and lubricating properties, oleaginous materials can be added. Additives which can be used for this purpose are heavy hydrocarbon stock such as petrolatum, paraffin wax, ozokerite, rod wax, slack wax, microcrystalline wax, said substances having attached thereto, if desired, polar groups such as $NH_2$, $NO_2$, OH, CHO, COOR, and the like. In addition, natural waxes such as carnauba wax, candellila wax, Japan wax, animal waxes, e. g. spermaceti, sperm oil, insect waxes, e. g. beeswax, Chinese insect wax and synthetic waxes, can be used, or asphaltic bitumens and blown semi-drying oils, such as blown rapeseed oil. Also, polyhydric alcohol-fatty acid esters such as glycerol mono-oleate, glycerol monostearate, pentaerythritol mono and dioleate and stearate, and the like can be used.

To aid in spreading the film-forming metal protective agent evenly, minor amounts of alcohols and more particularly the branched chain alcohols, keto alcohols and cycloalkanols having between about 5 to 19 carbon atoms in the molecule and preferably between about 6 to 8 carbon atoms, inclusive, are added to compositions of this invention. Keto alcohols and cyclic alcohols are preferred and include diacetone alcohol, 4-tertiaryamylcyclohexanol, ditertiaryamylcyclohexanol, methylcyclohexanol and the like. Branched-chain alcohols which can be used can be derived from alcohols containing 5 to 19 carbons or such alcohols as p-tertiaryamyl phenoxyethanol and ditertiaryamyl phenoxyethanol and the like. The alcohols need not be used in amounts above 10% by weight and usually are not added in excess of 5% by weight. The alcohols function as spreading agents. Thus once the wetting agent with the aid of the penetrant succeeds in getting to the surface and removing moisture or other contaminant, the alcohol helps spread uniformly the film-forming protective agent onto the treated surface.

All ingredients which constitute the present composition must be present at all times. The absence of any one ingredient reduces the overall efficiency of the composition to such a degree as to render it almost useless as a moisture displacing corrosion inhibiting composition.

Compositions of this invention may be formulated as follows:

| | Amount (per cent weight) |
|---|---|
| Petroleum residues as defined | 15 to 35 |
| Protective agents, e. g. lanolin, blown rapeseed oil, waxes, asphaltic bitumen and their mixtures | 2 to 15 |
| Wetting agents, e. g. petroleum sulfonates derived from solvent-treated raffinate oil fraction | 1 to 10 |
| Spreading agent, e. g. alcohols | 1 to 10 |
| Light hydrocarbon boiling between 50 and 370° C. | Balance |

The following examples are given by way of illustrating compositions of this invention, all parts being parts by weight.

EXAMPLE I

About 20 parts of a dark solid by-product remaining as residue after redistillation of a lime neutralized lubricating oil distillate from a naphthenic crude was dissolved in about 20 parts of white spirit (boiling point 140 to 160° C.) and the solution thus formed was filtered.

To the filtrate about 10 parts of lanolin, 3 parts of oil-soluble sodium naphtha sulfonate and 5 parts of zinc naphthenate were added and the mixture heated at about 50° C. until a homogeneous mass was obtained. The mixture was allowed to cool and then about 2 parts of diacetone alcohol, 10 parts of special boiling point spirit (boiling point 100 to 160° C.) and about 30 parts of white spirit (boiling point 140 to 160° C.) were added. The composition thus formed possessed excellent water displacing and anti-corrosion properties.

EXAMPLE II

The following table gives other compositions of this invention which may be prepared by the method set out in the above example:

To illustrate the pronounced corrosion inhibiting properties compositions of this invention possess, the following tests were made:

Two metal strips were cleaned and one metal strip was coated with composition of Example I and the other metal strip was coated with a commercial composition X known to contain lanolin and sodium petroleum sulfonate. The two metal strips were then subjected to outdoor weathering and signs of rusting, cracking or reticulation noted.

| Composition | Sign of Initial Rusting | Sign of Complete Rusting |
|---|---|---|
| Composition of Example I | | No sign of rusting after 30 days. |
| Commercial Composition X | 3 days | 5 days. |

Although the essential ingredients which constitute compositions of this invention must be present, other additives can be included such as linear polymer thickeners, asphalts, pour point depressants, dyes, alkyl and alkylol amines, organic acids, e. g. cresylic acid and naphthenic acid, phenolic compounds and the like. The addition of such additives is particularly desired when compositions of this invention are required to be used as temporary lubricants.

The present compositions may be applied to a surface to be protected by a means such as immersing, flooding, spraying, brushing, troweling and the like. The protective film formed on said surfaces adheres tenaciously enough to withstand handling, light polishing movement and high temperatures for long periods of time. It can be removed when desired by a suitable solvent or by simply rubbing with a cloth.

The present invention having thus been fully described is not to be limited by any specific examples which have been presented herein solely for the purpose of illustration, but only by the following claims.

We claim as our invention:

1. A composition for displacing moisture and preventing corrosion of metals having the following formula and proportions by weight:

| | Per cent |
|---|---|
| Limed petroleum residue rich in natural cyclic acids | 20 |
| Lanolin | 10 |
| Sodium salt of oil-soluble petroleum sulfonic acid derived from raffinate fraction of a solvent-treated oil | 3 |
| Zinc naphthenate | 5 |
| Diacetone alcohol | 2 |
| White spirits | Balance |

| | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| (a) Limed petroleum residue | x | | | x | x | | | x | x | | | x | x | x |
| Barium petroleum residue | | x | | | | x | | | | | | | | |
| Magnesium petroleum residue | | | x | | | | x | | | x | x | | | |
| (b) Lanolin | x | x | | x | | | | | | | | x | x | x |
| Blown rapeseed oil | | | x | | | | | x | x | | | | | x |
| Hydrocarbon residue from cracking of paraffin wax | | | | | x | x | | | | x | x | | | |
| (c) Na salt of oil-soluble naphtha sulfonic acid | x | x | | | x | x | x | | | x | | x | x | x |
| Ca salt of oil-soluble petroleum sulfonic acid (both acids obtained from oil raffinate fraction) | | | x | x | | | | x | x | | x | | | |
| Ca naphthenate | | | | | | | | | | x | x | x | | |
| Zn naphthenate | | x | x | x | x | | | x | | | | | | x |
| (d) Diacetone alcohol | x | x | | x | x | | | x | | x | x | | x | |
| Cyclohexanol | | | | | | x | x | | x | | | x | x | |
| (e) Light hydrocarbon boiling from 50 to 370° C. and mixtures thereof | x | x | x | x | x | x | x | x | x | x | x | x | x | x |

The amounts of each additive used may vary within the scope as set forth hereinbefore.

2. A composition for displacing moisture and preventing corrosion of metals having the following formula and proportions by weight:

| | Per cent |
|---|---|
| Alkaline earth metal salt of petroleum residues rich in natural cyclic acids | 15 to 35 |
| Lanolin | 2 to 15 |
| Alkali metal salt of oil-soluble petroleum sulfonate derived from raffinate fraction of a solvent-treated oil | 1 to 10 |
| Alcohol selected from the group consisting of aliphatic and cycloaliphatic alcohols | 1 to 10 |
| Light petroleum hydrocarbon boiling between 50° and 370° C. | Balance |

3. A composition for displacing moisture and preventing corrosion of metal surfaces comprising a major amount of white spirits, between 15% and 35% of alkaline earth metal salt of petroleum residues rich in natural cyclic acids, between 1% and 10% of alkali metal salt of oil-soluble petroleum sulfonic acid, between 1% and 10% of an aliphatic alcohol and between 2% and 15% of lanolin, all percentages being by weight.

4. A composition for displacing moisture and preventing corrosion of metal surfaces comprising a major amount of white spirits, between 15% and 35% of alkaline earth metal salt of petroleum residues rich in natural cyclic acids, between 1% and 10% of alkali metal salt of oil-soluble petroleum sulfonic acid, between 1% and 10% of an aliphatic alcohol and between 2% and 15% of neutralized wool fat, all percentages being by weight.

5. A composition for displacing moisture and preventing corrosion of metal surfaces comprising a major amount of white spirits, between 15% and 35% of alkaline earth metal salt of petroleum residues rich in natural cyclic acids, between 1% and 10% of alkali metal salt of oil-soluble petroleum sulfonic acid, between 1% and 10% of an aliphatic alcohol and between 2% and 15% of blown rapeseed oil, all percentages being by weight.

6. A composition for displacing moisture and preventing corrosion of metal surfaces comprising a major amount of kerosene, between 15% and 35% of alkaline earth metal salt of petroleum residues rich in natural cyclic acids, between 1% and 10% of alkali metal salt of oil-soluble petroleum sulfonic acid, between 1% and 10% of an aliphatic alcohol and between 2% and 15% of lanolin, all percentages being by weight.

7. A composition for displacing moisture and preventing corrosion of metal surfaces comprising a major amount of kerosene, between 15% and 35% of alkaline earth metal salt of petroleum residues rich in natural cyclic acids, between 1% and 10% of alkali metal salt of oil-soluble petroleum sulfonic acid, between 1% and 10% of an aliphatic alcohol and between 2% and 15% of neutralized wool fat, all percentages being by weight.

8. A composition for displacing moisture and preventing corrosion of metal surfaces comprising a major amount of kerosene, between 15% and 35% of alkaline earth metal salt of petroleum residues rich in natural cyclic acids, between 1% and 10% of alkali metal salt of oil-soluble petroleum sulfonic acid, between 1% and 10% of an aliphatic alcohol and between 2% and 15% of blown rapeseed oil, all percentages being by weight.

9. A composition for displacing moisture and preventing corrosion of metal surfaces comprising a major amount of white spirits, between 15% and 35% of alkaline earth metal salt of petroleum residues rich in natural cyclic acids, between 1% and 10% of alkali metal salt of oil-soluble petroleum sulfonic acid, between 1% and 10% diacetone alcohol and between 2% and 15% lanolin, all percentages being by weight.

10. A composition for displacing moisture and preventing corrosion of metal surfaces comprising a major amount of white spirits, between 15% and 35% of alkaline earth metal salt of petroleum residues rich in natural cyclic acids, between 1% and 10% of alkali metal salt of oil-soluble petroleum sulfonic acid, between 1% and 10% methyl cyclohexanol and between 2% and 15% of neutralized wool fat, all percentages being by weight.

11. A composition for displacing moisture and preventing corrosion of metal surfaces comprising a major amount of a light petroleum hydrocarbon boiling from 50° to 370° C., between 15% and 35% of alkaline earth metal salt of petroleum residues rich in natural cyclic acids, between 1% and 10% of an oil-soluble alkali metal petroleum sulfonate, between 1% and 10% of an aliphatic alcohol and between 2% and 15% of a fatty material selected from the group consisting of fatty oil and esters of high molecular weight fatty acids, all percentages being by weight.

12. An anti-corrosion composition comprising a major amount of a light petroleum hydrocarbon having a boiling point not exceeding about 370° C., between 15% and 35% by weight of a metal salt of petroleum residues rich in natural cyclic acids, between 1% and 10% by weight each of an oil-soluble sulfonate and an alcohol selected from the group consisting of aliphatic and cycloaliphatic alcohols and between 2% and 15% by weight of a fatty material selected from the group consisting of fatty oil and esters of high molecular weight fatty acids.

13. An anti-corrosion composition comprising a major amount of a light petroleum hydrocarbon having a boiling point not exceeding about 370° C., between 15% and 35% by weight of a salt of petroleum residues rich in natural cyclic acids, between 1% and 10% by weight each of an oil-soluble sulfonate and an alcohol selected from the group consisting of aliphatic and cycloaliphatic alcohols and between 2% and 15% by weight of a fatty material selected from the group consisting of fatty oil and esters of high molecular weight fatty acids.

14. An anti-corrosion composition comprising a major amount of a light petroleum hydrocarbon having a boiling point not exceeding about 370° C., between 15% and 35% by weight of a metal salt of a petroleum residue rich in natural cyclic acids, between 1% and 10% by weight each of an oil-soluble sulfonate and a cycloaliphatic alcohol containing 5 to 19 carbon atoms in the molecule and between 2% and 15% by weight of a fatty material selected from the the group consisting of a fatty oil and an ester of a high molecular weight fatty acid.

15. An anti-corrosion composition comprising a major amount of a light petroleum hydrocarbon having a boiling point not exceeding about 370° C., between 15% and 35% by weight of a metal salt of a petroleum residue rich in natural cyclic acids, between 1% and 10% by weight each of an oil-soluble sulfonate and an aliphatic alcohol containing 5 to 19 carbon atoms in the molecule and between 2% and 15% by weight of a fatty material selected from the group consisting of a fatty oil and an ester of a high molecular weight fatty acid.

16. An anti-rust composition comprising a major amount of a light liquid petroleum hydrocarbon and minor amounts each of the following materials: between 15 and 35% by weight of a metal salt of petroleum residues rich in natural cyclic acids, between 1% and 10% by weight each of an oil-soluble sulfonate, and an alcohol selected from the group consisting of aliphatic and cycloaliphatic alcohols, and between 2 and 15% by weight of a fatty material selected from the group consisting of fatty oil and esters of high molecular weight fatty acids.

GERALD DAVID GALVIN.
ALEXANDER ESPIE McAULAY.

REFERENCES CITED

The following references are of record in the file of this patent:

UNITED STATES PATENTS

| Number | Name | Date |
|---|---|---|
| 92,924 | Wyckoff | July 20, 1867 |
| 158,095 | Lee | Dec. 22, 1874 |
| 2,182,992 | Lebo | Dec. 12, 1939 |
| 2,373,787 | Sharp | Apr. 17, 1945 |
| 2,392,102 | Ruedrich | Jan. 1, 1946 |
| 2,402,793 | White et al. | June 25, 1946 |
| 2,450,321 | White | Sept. 28, 1948 |
| 2,509,786 | Schiermeier | May 30, 1950 |